US012402175B2

(12) United States Patent
Cao et al.

(10) Patent No.: US 12,402,175 B2
(45) Date of Patent: Aug. 26, 2025

(54) POWER CONTROL FOR RANDOM ACCESS PROTOCOLS

(71) Applicant: ZTE Corporation, Guangdong (CN)

(72) Inventors: Wei Cao, Guangdong (CN); Li Tian, Guangdong (CN); Ziyang Li, Guangdong (CN); Junfeng Zhang, Guangdong (CN); Chenchen Zhang, Guangdong (CN)

(73) Assignee: ZTE Corporation, Shenzhen (CN)

( * ) Notice: Subject to any disclaimer, the term of this patent is extended or adjusted under 35 U.S.C. 154(b) by 454 days.

(21) Appl. No.: 17/403,386

(22) Filed: Aug. 16, 2021

(65) Prior Publication Data

US 2021/0378024 A1 Dec. 2, 2021

Related U.S. Application Data

(63) Continuation of application No. PCT/CN2019/075071, filed on Feb. 14, 2019.

(51) Int. Cl.
*H04W 74/0836* (2024.01)
*H04W 52/24* (2009.01)
*H04W 52/34* (2009.01)

(52) U.S. Cl.
CPC ..... *H04W 74/0836* (2024.01); *H04W 52/243* (2013.01); *H04W 52/343* (2013.01)

(58) Field of Classification Search
CPC ........... H04W 74/0833; H04W 52/243; H04W 52/343
See application file for complete search history.

(56) References Cited

U.S. PATENT DOCUMENTS

| 10,681,648 | B2* | 6/2020 | Jeon ..................... H04W 52/281 |
| 10,880,895 | B2* | 12/2020 | Gordaychik ........ H04W 72/044 |
| 11,445,549 | B2* | 9/2022 | Yerramalli .......... H04W 52/362 |
| 2008/0119215 | A1 | 5/2008 | Ji et al. |

(Continued)

FOREIGN PATENT DOCUMENTS

| CN | 101494479 A | 7/2009 |
| CN | 102547952 A | 7/2012 |

(Continued)

OTHER PUBLICATIONS

3GPP TS 38.211 V15.4.0 (Dec. 2018) (Year: 2018).*

(Continued)

*Primary Examiner* — Michael J Moore, Jr.
(74) *Attorney, Agent, or Firm* — Perkins Coie LLP (57) ABSTRACT

Methods, systems, and devices for power control for random access protocols in mobile communication technology are described. An exemplary method for wireless communication includes broadcasting, by a network node serving a cell, an indication of a transmit power level that is specific to the cell, wherein the indication is for use by a wireless device operating in the cell for a two-step random access procedure. Another exemplary method for wireless communication includes receiving, by a wireless device operating in a cell served by a network node, an indication of a transmit power level that is specific to the cell for use in a two-step random access procedure, and transmitting, at the transmit power level, a first message of the two-step random access procedure.

10 Claims, 8 Drawing Sheets

(56) References Cited

U.S. PATENT DOCUMENTS

| | | | |
|---|---|---|---|
| 2008/0220805 A1* | 9/2008 | Dayal | H04W 52/28 |
| | | | 455/522 |
| 2010/0056153 A1 | 3/2010 | Attar et al. | |
| 2011/0044247 A1 | 2/2011 | Luo et al. | |
| 2012/0224552 A1* | 9/2012 | Feuersanger | H04W 72/23 |
| | | | 370/329 |
| 2012/0252523 A1 | 10/2012 | Ji et al. | |
| 2013/0267269 A1 | 10/2013 | Fang et al. | |
| 2014/0056176 A1* | 2/2014 | Ramesh | H04L 45/02 |
| | | | 370/255 |
| 2015/0223141 A1 | 8/2015 | Chatterjee et al. | |
| 2015/0319702 A1 | 11/2015 | Patel et al. | |
| 2016/0330011 A1* | 11/2016 | Lee | H04L 5/14 |
| 2017/0026904 A1 | 1/2017 | Ode | |
| 2018/0279376 A1* | 9/2018 | Dinan | H04W 74/0836 |
| 2019/0053313 A1* | 2/2019 | Zhou | H04W 52/50 |
| 2019/0149365 A1* | 5/2019 | Chatterjee | H04L 25/0226 |
| | | | 370/329 |
| 2019/0230603 A1* | 7/2019 | Liu | H04W 52/42 |
| 2020/0100299 A1* | 3/2020 | Loehr | H04W 72/0446 |
| 2020/0260485 A1* | 8/2020 | Lei | H04W 72/23 |
| 2021/0378024 A1* | 12/2021 | Cao | H04W 74/0836 |
| 2022/0086765 A1* | 3/2022 | Zhang | H04W 52/50 |
| 2022/0217652 A1* | 7/2022 | Li | H04W 52/50 |

FOREIGN PATENT DOCUMENTS

| | | | | |
|---|---|---|---|---|
| CN | 102843777 A | | 12/2012 | |
| CN | 104411005 A | | 3/2015 | |
| CN | 108024351 A | * | 5/2018 | ........ H04W 36/0011 |
| CN | 109428657 A | * | 3/2019 | ........... H04B 17/318 |
| EP | 2605467 A1 | | 6/2013 | |
| WO | 2011150768 A1 | | 12/2011 | |
| WO | 2015149639 A1 | | 10/2015 | |
| WO | 2020163032 A1 | | 8/2020 | |

OTHER PUBLICATIONS

International Search Report and Written Opinion mailed on Oct. 31, 2019 for International Application No. PCT/CN2019/075071, filed on Feb. 14, 2019 (6 pages).

European Search Report for EP Patent Application No. 19915240.6, dated Aug. 4, 2022, 9 pages.

European Communication pursuant to Article 94(3) EPC issued in EP Patent Application No. 19915240.6, dated Jan. 27, 2025, 5 pages.

Chinese Notification to Complete Formalities of Registration issued in CN Patent Application No. 201980091633.9, dated Nov. 1, 2024, 7 pages. English translation included.

Ericsson, "Further LTE Physical Layer Enhancements for MTC," 3GPP TSG RAN meeting #69, RP-151186, Phoenix, USA, Sep. 14-16, 2015, 20 pages.

Ericsson, "Improved synchronized RRC procedures," 3GPP TSG-RAN2 Meeting #91bis, R2-154205, Malmo, Sweden, Oct. 5-9, 2015, 6 pages.

Chinese office action issued in CN Patent Application No. 201980091633.9, dated Aug. 8, 2024, 13 pages. English translation included.

Chinese office action issued in CN Patent Application No. 201980091633.9, dated May 17, 2024, 14 pages. English translation included.

* cited by examiner

800 — Broadcasting, by a network node serving a cell, an indication of a transmit power level that is specific to the cell — 802

FIG. 8A

810 — Receiving, by a wireless device operating in a cell served by a network node, an indication of a transmit power level that is specific to the cell for use in a two-step random access procedure — 812

Transmitting, at the transmit power level, a first message of the two-step random access procedure — 814

POWER CONTROL FOR RANDOM ACCESS PROTOCOLS

CROSS-REFERENCE TO RELATED APPLICATIONS

This application is a continuation of and claims priority to International Patent Application No. PCT/CN2019/075071, filed on Feb. 14, 2019, the contents of which are incorporated herein by reference in their entirety.

TECHNICAL FIELD

This document is directed generally to wireless communications.

BACKGROUND

Wireless communication technologies are moving the world toward an increasingly connected and networked society. The rapid growth of wireless communications and advances in technology has led to greater demand for capacity and connectivity. Other aspects, such as energy consumption, device cost, spectral efficiency, and latency are also important to meeting the needs of various communication scenarios. In comparison with the existing wireless networks, next generation systems and wireless communication techniques need to provide support for an increased number of users and devices, as well as support for higher data rates, thereby requiring user equipment to implement power control for random access protocols.

SUMMARY

This document relates to methods, systems, and devices for generating sequences for reference signals in mobile communication technology, including 5th Generation (5G) and New Radio (NR) communication systems.

In one exemplary aspect, a wireless communication method is disclosed. The method includes broadcasting, by a network node serving a cell, an indication of a transmit power level that is specific to the cell, wherein the indication is for use by a wireless device operating in the cell for a two-step random access procedure.

In another exemplary aspect, a wireless communication method is disclosed. The method includes receiving, by a wireless device operating in a cell served by a network node, an indication of a transmit power level that is specific to the cell for use in a two-step random access procedure, and transmitting, at the transmit power level, a first message of the two-step random access procedure.

In yet another exemplary aspect, the above-described methods are embodied in the form of processor-executable code and stored in a computer-readable program medium.

In yet another exemplary embodiment, a device that is configured or operable to perform the above-described methods is disclosed.

The above and other aspects and their implementations are described in greater detail in the drawings, the descriptions, and the claims.

DETAILED DESCRIPTION

There is an increasing demand for fourth generation of mobile communication technology (4G, the 4th Generation mobile communication technology), Long-term evolution (LTE, Long-Term Evolution), Advanced long-term evolution (LTE-Advanced/LTE-A, Long-Term Evolution Advanced) and fifth-generation mobile communication technology (5G, the 5th Generation mobile communication technology). From the current development trend, 4G and 5G systems are studying the characteristics of supporting enhanced mobile broadband, ultra-high reliability, ultra-low latency transmission, and massive connectivity.

Figure 1:
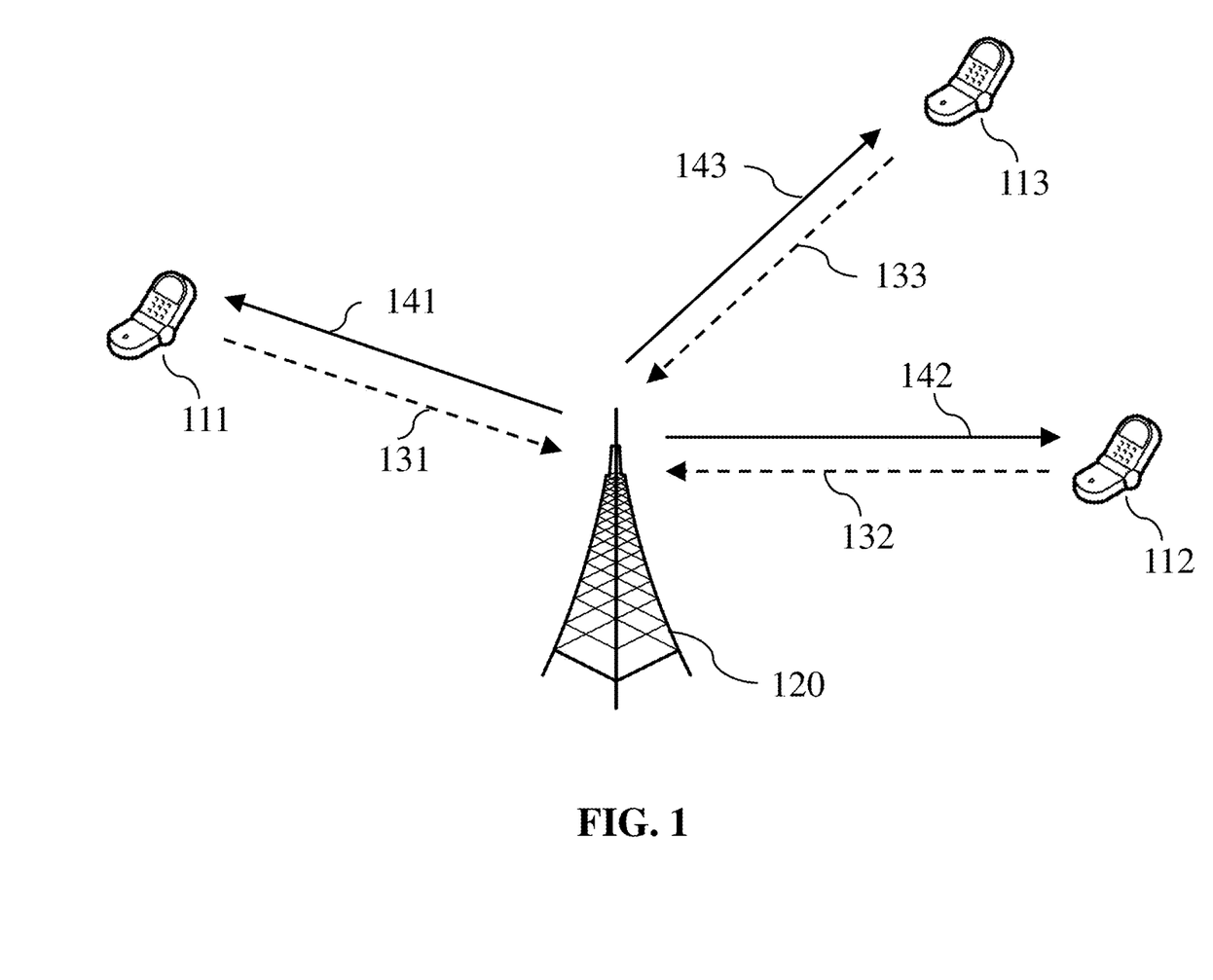
FIG. 1 shows an example of a base station (BS) and user equipment (UE) in wireless communication, in accordance with some embodiments of the presently disclosed technology.

Embodiments of the disclosed technology provide methods and systems for power control for random access procedures (e.g., 2-step RACH) in current cellular systems. FIG. 1 shows an example of a wireless communication system (e.g., an LTE, 5G or New Radio (NR) cellular network) that includes a BS 120 and one or more user equipment (UE) 111, 112 and 113. In some embodiments, the downlink transmissions (141, 142, 143) include an indication of a cell-specific transmit power level that is provided to the UEs being served by this BS. The uplink transmissions (131, 132, 133) include the first message of a 2-step RACH procedure. The UE may be, for example, a smartphone, a tablet, a mobile computer, a machine to machine (M2M) device, a terminal, a mobile device, an Internet of Things (IoT) device, and so on.

The present document uses section headings and sub-headings for facilitating easy understanding and not for limiting the scope of the disclosed techniques and embodiments to certain sections. Accordingly, embodiments disclosed in different sections can be used with each other. Furthermore, the present document uses examples from the 3GPP New Radio (NR) network architecture and 5G protocol only to facilitate understanding and the disclosed techniques and embodiments may be practiced in other wireless systems that use different communication protocols than the 3GPP protocols.

Overview of Random Access Procedures

Figure 2:
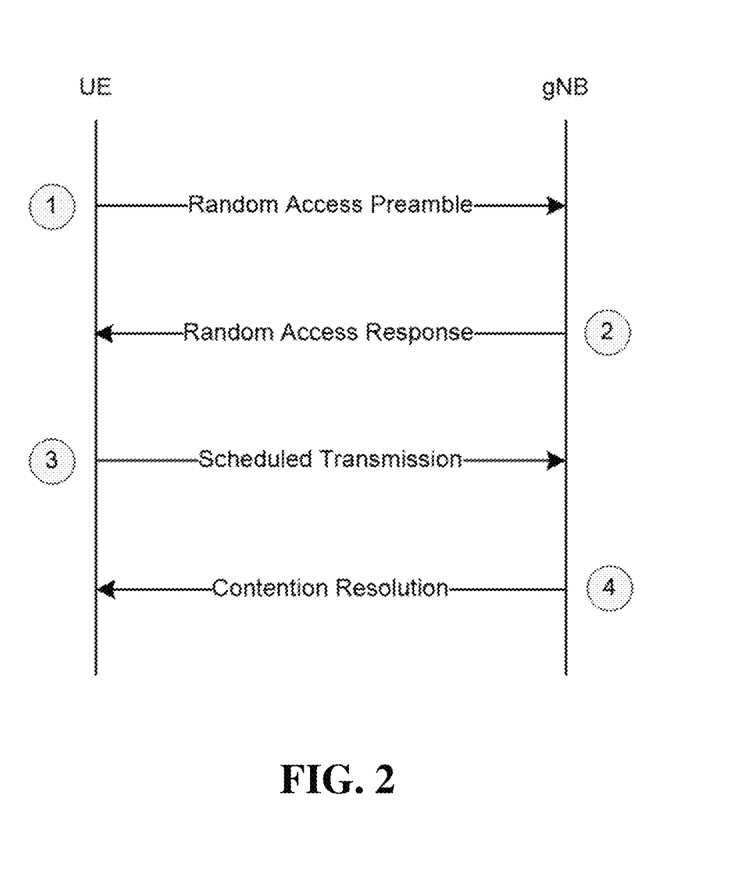
FIG. 2 shows an example of the message flow in a 4-step random access protocol.

FIG. 2 shows an example of a contention-based LTE random access procedure involving four steps. As shown in FIG. 2, four messages (designated MSG1 to MSG4) are transmitted between the UE and the BS (e.g., the gNB in FIG. 2), and include (1) the Random Access Preamble, (2) the Random Access Response, (3) the Scheduled Transmission and (4) the Contention Resolution.

In the 4-step RACH, the transmission power of MSG3 (Scheduled Transmission in FIG. 2) is indicated by the BS via MSG2 (Random Access Response in FIG. 2). In some embodiments, the format of MSG2 is shown in Table 1.

TABLE 1

Random Access Response (MSG2) Grant Content field size

| RAR grant field | Number of bits |
| --- | --- |
| Frequency hopping flag | 1 |
| Msg3 PUSCH frequency resource allocation | 14 |
| Msg3 PUSCH time resource allocation | 4 |
| MCS | 4 |
| TPC command for Msg3 PUSCH | 3 |
| CSI request | 1 |

In some embodiments, the UE applies the TPC command for Msg3 PUSCH (the Transmit Power control Command which was received in MSG2) to the subsequent MSG3 (Scheduled Transmission in FIG. 2).

Figure 3:
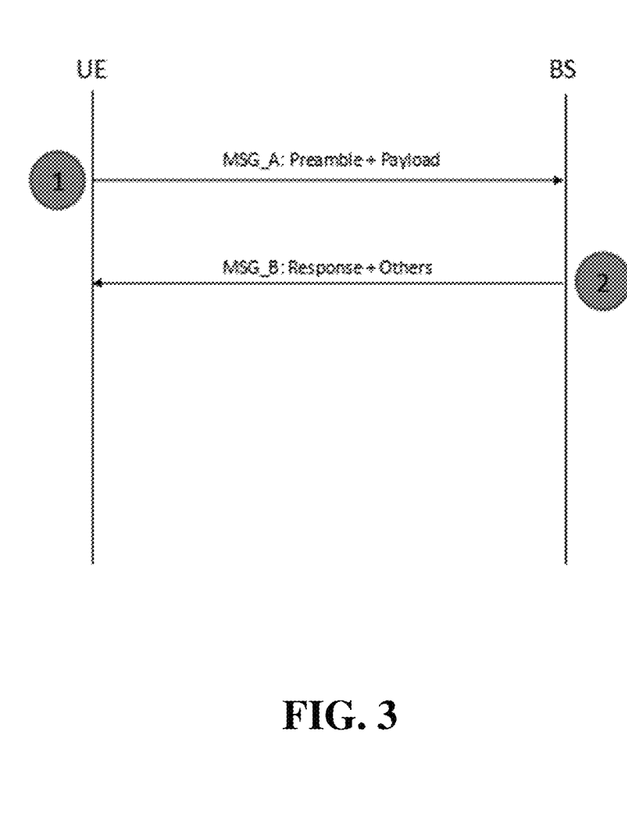
FIG. 3 shows an example of the message flow in a 2-step random access protocol.

FIG. 3 shows an example of the 2-step RACH, which is incorporated into embodiments of the disclosed technology. As shown in FIG. 3, the contention-based random access procedure involves the transmission of two messages (designated MSG_A and MSG_B) between the UE and the BS. MSG_A includes the preamble and the payload, whereas MSG_B includes the response and other messages.

Overview of Inter-Cell Interference Coordination

The performance of a cellular wireless communication network is generally interference-limited. In a given geographical area covered by multiple cells, a given frequency band can be used by different cells. And co-channel interference arises among those cells sharing the same frequency band. To mitigate uplink co-channel interference, the transmission power of a given UE can be adjusted by BS. The TPC command for Msg3 PUSCH is an example.

In some embodiments, coordinating transmission power among cells is based on pre-configuring resources. An example of pre-configured resources in shown in FIG. 4. As shown therein, cells 1, 2 and 3 are neighboring cells and share the same frequency resources, A, B and C. It is possible to pre-configure the resource A as cell 1's "cell-edge band", on which cell 1 can have a higher uplink transmission power. With this pre-configuration, cells 2 and 3 cannot allocate resource A to their cell-edge UEs to keep a low uplink transmission power. The same principle applies to resources B and C for cells 2 and 3, respectively. Generally, this pre-configuration is semi-static, which typically results in a lack of flexibility in resource allocation.

In some embodiments (e.g., LTE), BSs can exchange interference indications via the X2 or Xn interface. In an exemplary implementation, there are two different indications: High Interference Indication (HII) and Overload Indication (OI).

Figure 5:
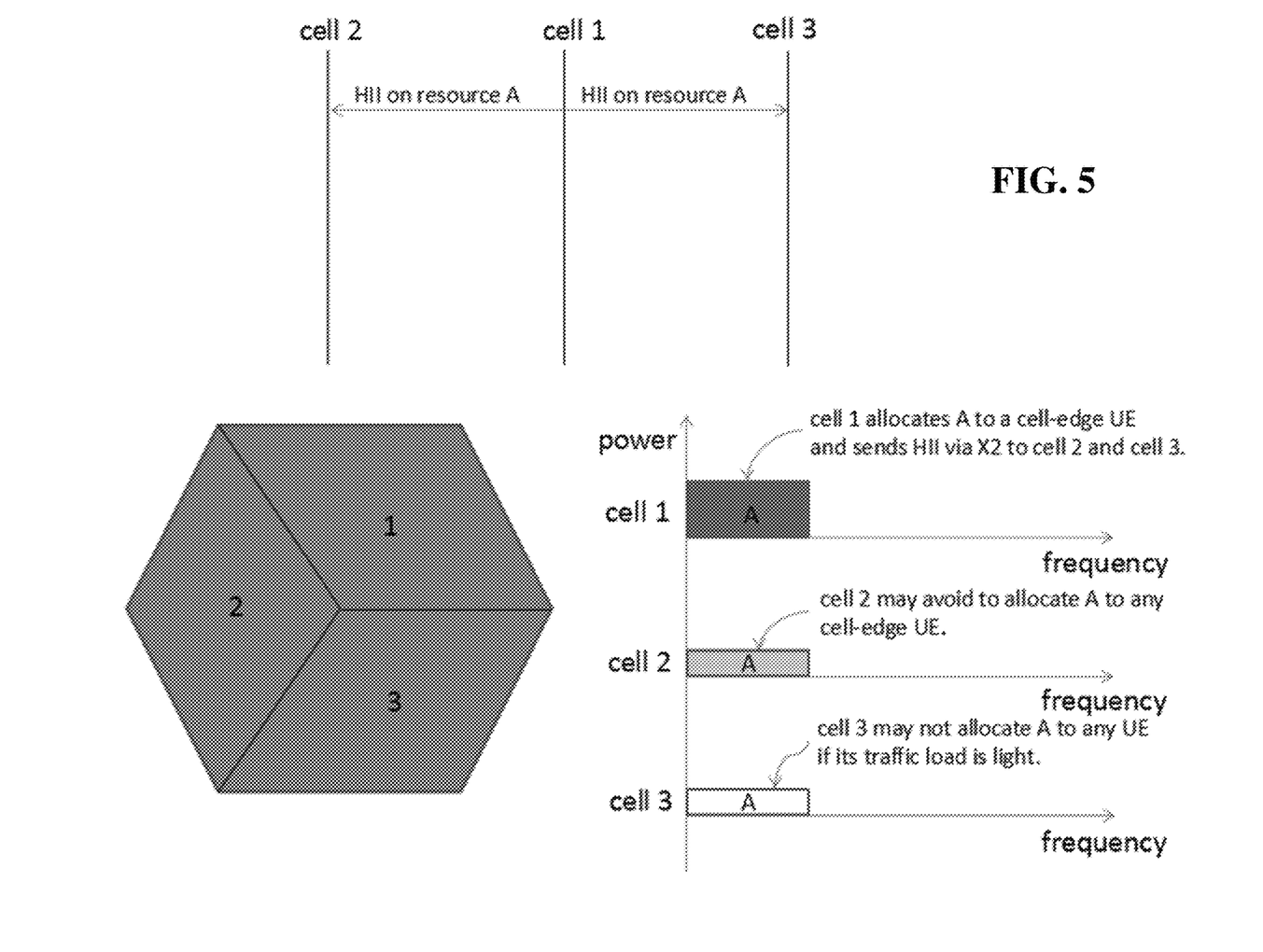
FIG. 5 shows an example of using a high interference indication (HII).

An example of HII is shown in FIG. 5. As shown therein, cell 1 allocates resource A to its cell-edge UE, which would typically result in a high transmission power being expected on A. Thus, cell 1 sends an HII via the X2 (or Xn) interface to cells 2 and 3. Cell 2 checks its own resource allocation and may avoid allocate A to any cell-edge UE. Cell 3 may have very light traffic at that time, and it may not allocate A to any UE.

Figure 6:
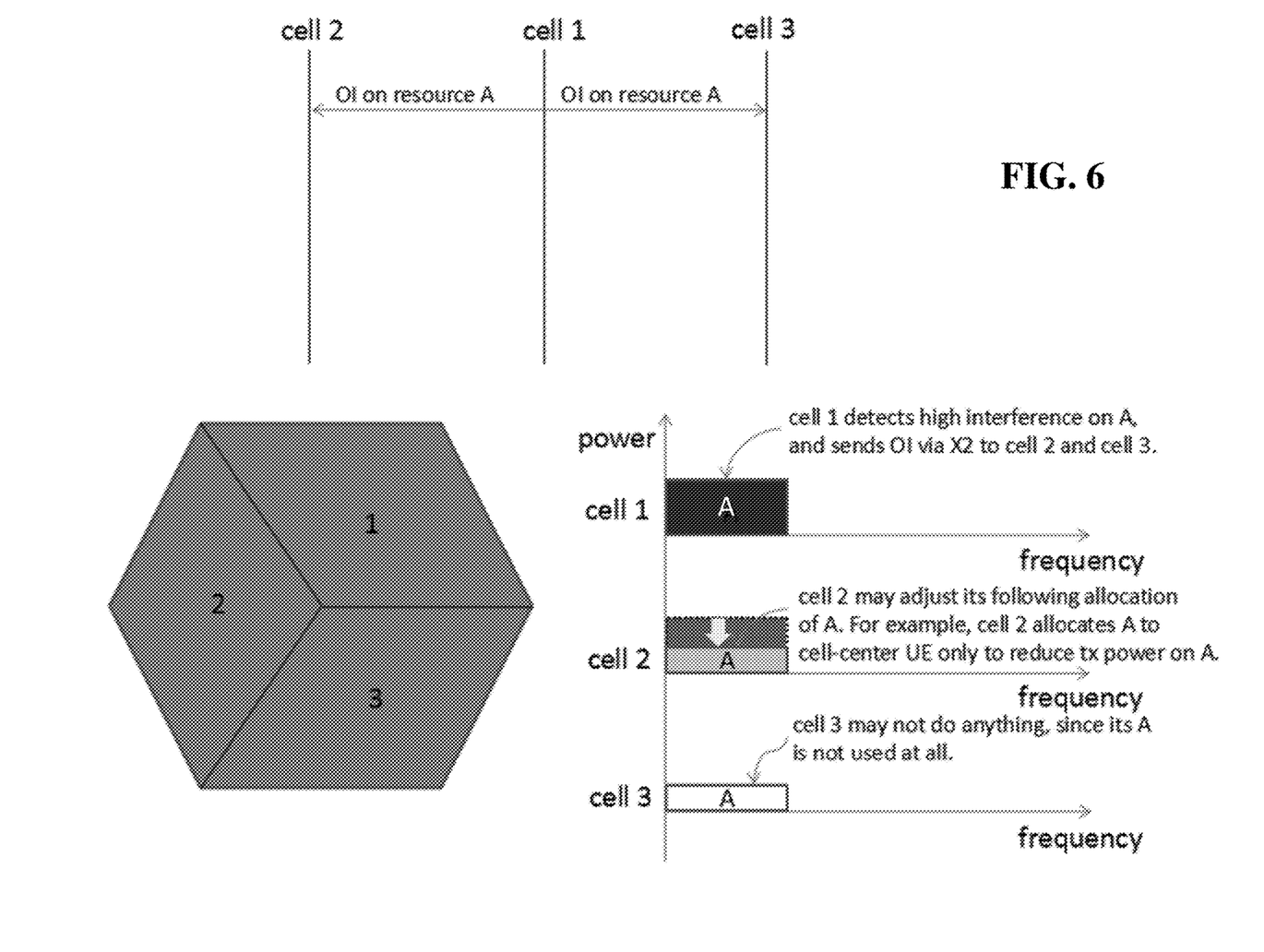
FIG. 6 shows an example of using an overload indication (OI).

An example of OI is shown in FIG. 6. As shown therein, cell 1 detects high interference on resource A, and sends an OI via an X2 (or Xn) interface to cells 2 and 3. Cell 2 checks its own resource allocation and may allocate A to cell-center UEs only to reduce uplink transmission power on A. Cell 3 checks its own resource allocation and may find A has not been used at all due to very light traffic.

In these examples, inter-cell interference coordination is directly controlled by BS via UE-specific resource allocation or closed-loop adjustment. In contrast, embodiments of the disclosed technology that deploy the 2-step RACH include the UE transmitting its payload without UE-specific resource allocation or closed-loop adjustment.

Exemplary Embodiments for Power Control for Random Access Procedures

In some embodiments (e.g., LTE), power control is carried out using the following formula for each physical channel:

$$P = P_0 + \alpha \cdot \text{path\_loss} + \text{dynamic\_offset} + \text{bandwidth\_factor}.$$

Herein, $P_0$ is the target received power at BS, $\alpha \cdot \text{path\_loss}$ is to compensate for propagation path attenuation, dynamic_offset is a UE-specific closed-loop control parameter, and bandwidth_factor is an adjustment associated with the transmission bandwidth used.

In contrast, embodiments of the disclosed technology use the following formula for each physical channel:

$$P = P_0 + \alpha \cdot \text{path\_loss} + \text{dynamic\_offset}_{new} + \text{bandwidth\_factor}.$$

Herein, $\text{dynamic\_offset}_{new}$ is a cell-specific parameter.

In some embodiments, a network node may broadcast power control information that can be used by the UEs to set their transmit power level for the MSG_A that is transmitted as part of the 2-step RACH procedure. The following exemplary cases are provided to explain certain features of the disclosed embodiments.

Figure 4:
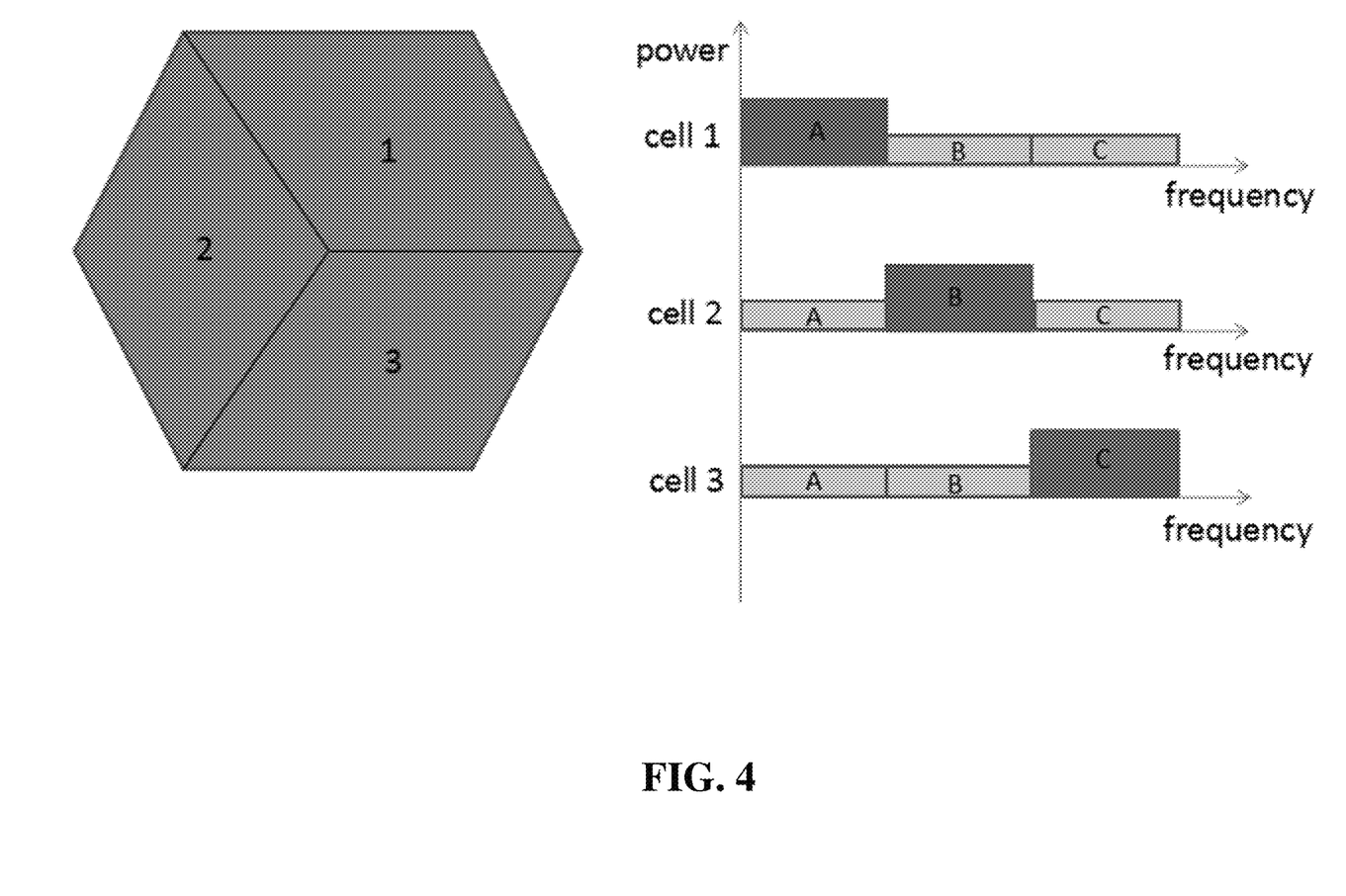
FIG. 4 shows an example of pre-configured coordination among cells.

Case 1. In the context of FIG. 4, if resource pre-configuration is used in inter-cell interference coordination, the broadcast information can include different transmission power offset on different resources; an example is shown in Table 2.

TABLE 2

Resource indexes and transmission power offsets for pre-configured resources

| Resource index | Transmission power offset |
| --- | --- |
| A | Offset$_1$ |
| B | Offset$_2$ |
| C | Offset$_2$ |

In some embodiments, with an exemplary resource being the Physical Resource Block (PRB), the resource index may be one of the following:

(1) A PRB start index and a PRB number, to indicate consecutive PRB resources
(2) A PRB start index and end index, to indicate consecutive PRB resources
(3) A list of PRB indexes, to indicate consecutive or distributed PRB resources In some embodiments, the transmission power offset may be one of the following:

(1) Offset$_1$ and Offset$_2$ values. For example, on resource A, Offset$_1$=0 dB and Offset$_2$=−3 dB may be defined;
(2) Offset$_1$ and a differential offset delta$_{offset}$ (may be positive or negative). Then Offset$_2$=Offset$_1$+delta$_{offset}$. For example, on resource A, define Offset$_1$=0 dB, delta$_{offset}$=−3 dB, so that Offset$_2$=−3 dB.

Case 2. In the context of FIGS. 5 and 6, if dynamic indications (e.g., HII or OI) are used in inter-cell interference coordination, the broadcast information of a cell is dynamically changed. In an example, cell 1 allocates resource A to its cell-edge UE, which means a high transmission power is expected on A. Thus, cell 1 sends an HII via X2 (or Xn) to cells 2 and 3. Cells 2 and 3 may need to broadcast following information to avoid high uplink transmission power on A. In another example, cell 1 detects high interference on resource A, and sends an OI via X2 to cells 2 and 3. Cells 2 and 3 may need to broadcast following information to reduce high uplink transmission power on A. For An example is shown in Table 3.

TABLE 3

Resource indexes and transmission power offsets for dynamically configured resources

| Resource index | Transmission power offset |
|---|---|
| A | $Offset_1$ |
| B | $Offset_2$ |
| C | $Offset_2$ |

In some embodiments, with an exemplary resource being the Physical Resource Block (PRB), the resource index may be one of the following:
(1) A PRB start index and a PRB number, to indicate consecutive PRB resources
(2) A PRB start index and end index, to indicate consecutive PRB resources
(3) A list of PRB indexes, to indicate consecutive or distributed PRB resources In some embodiments, the transmission power offset may be one of the following:
(1) $Offset_1$ and $Offset_2$ values. For example, on resource A, $Offset_1$=0 dB and $Offset_2$=−3 dB may be defined;
(2) $Offset_1$ and a differential offset $delta_{offset}$ (may be positive or negative). Then $Offset_2$=$Offset_1$+$delta_{offset}$. For example, on resource A, define $Offset_1$=0 dB, $delta_{offset}$=−3 dB, so that $Offset_2$=−3 dB.
(3) Only the modified (or updated) value is broadcast. For example, only $Offset_1$ corresponding to resource A is changed due to the HII. Thus, only the updated $Offset_1$=−3 dB can be broadcast.
(4) Only the differential (or power gap/offset) is broadcast. For example, $Offset_1$ on resource A is changed from −3 dB to −6 dB upon reception of HII. So the difference (or gap) between new value and old value is −6−(−3)=−3 dB, and thus, −3 dB can be broadcast. The UE will accumulate the differences received to obtain the latest $Offset_1$.

Figure 7:
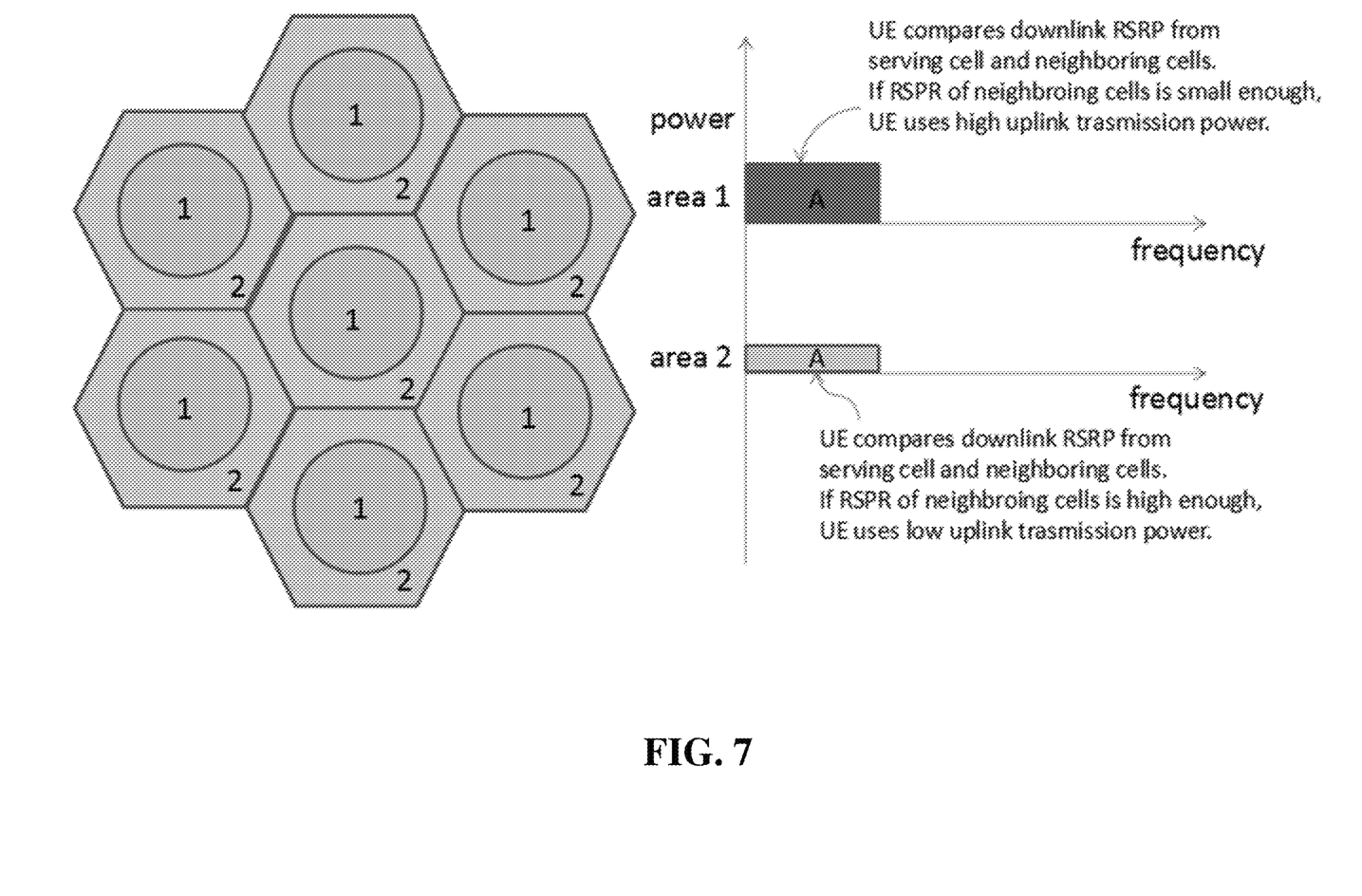
FIG. 7 shows an example of a geographical area based broadcast.

Case 3. In some embodiments, and if an area-based inter-cell interference coordination strategy is used, the broadcast information can also be used, as shown in FIG. 7. As shown therein, a cell is represented by a hexagon, which is divided into cell-center (denoted "1") part and cell-edge (denoted "2") part, and the transmit power level of a UE may be determined based on its location within the cell (e.g., whether it is in region "1" or region "2").

In some embodiments, the hexagonal cell may be divided into more regions, e.g. finer granularity, with different transmit power levels for each of the regions.

The UE may determine its location using a variety of methods; examples include:
(1) UEs continuously monitor and compare downlink Reference Signal Received Power (RSRP) from both serving cell and neighboring cells. In cell-center, a UE may find RSRP from neighboring cells is small, and it can use a high uplink transmission power without severe interfering UEs in neighboring cells. In cell-edge, a UE may find RSRP from neighboring cells is high, and it needs to use a low uplink transmission power to avoid severe interfering UEs in neighboring cells.
(2) In a satellite communication networks, a UE has its own location information, the location information of BS on satellites and the cell definition on the ground. So if geographical information of cell-center and cell-edge is broadcast, the UE can adjust its uplink transmission power accordingly.

In this scenario, the broadcast information from the BS is given in Table 4.

TABLE 4

Information available in geographical area based broadcasts

| Comparison criteria | Transmission power offset |
|---|---|
| $Threshold_1$ | $Offset_1$ |
| $Threshold_2$ | $Offset_2$ |

In some embodiments, the comparison criterion may be one of the following:
(1) Ratio of serving cell RSRP and neighboring cell RSRP, or vice versa.
(2) Ratio of serving cell distance and neighboring cell distance, or vice versa (e.g., applicable in satellite communications with LOS channel and when the UE knows all reachable BS locations and its own location).
(3) An area boundary to be compared with UE's location
(4) More than one threshold for multiple transmission power offsets
(5) Use a single threshold; e.g., if the criteria is valid, then apply the offset in power control. Otherwise, no offset will be added in power control.

In some embodiments, the transmission power offset may be:
(1) $Offset_1$ and $Offset_2$ values when UEs fulfill comparison criteria $Threshold_1$ and $Threshold_2$, respectively. For example, if $RSRP_{serving}/RSRP_{neighboring}$>$Threshold_1$, UE uses $Offset_1$ in its power control, whereas if $RSRP_{serving}/RSRP_{neighboring}$<$Threshold_2$, UE uses $Offset_2$ in its transmission power.

Exemplary Methods for the Disclosed Technology

Embodiments of the disclosed technology advantageously result in UEs being able to determine its transmit power in a 2-step RACH procedure based on resource and/or geographical information, and without the need for UE-specific signaling. For example, the methods disclosed herein are applicable to both semi-static and dynamic inter-cell interference coordination among base stations during 2-step RACH procedures with the UEs being served.

Figure 8A:
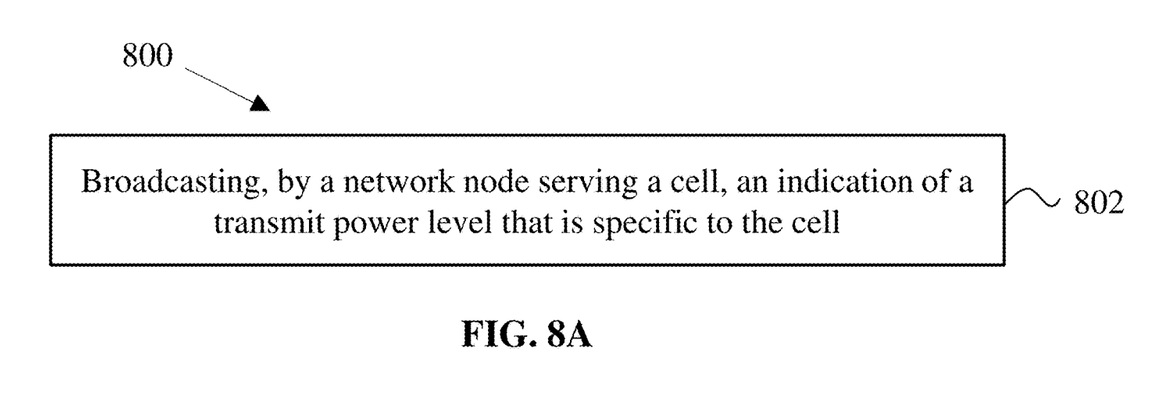
FIGS. 8A and 8B show examples of a wireless communication methods.

FIG. 8A shows an example of a wireless communication method 800 for power control for random access procedures in mobile communication technology. The method 800 includes, at step 802, broadcasting, by a network node serving a cell, an indication of a transmit power level that is specific to the cell, where the indication is for use by a wireless device operating in the cell for a two-step random access procedure. In some embodiments, the indication of the transmit power level may be the power level itself. In other embodiments, an implicit or explicit field may be the indication of the transmit power level. In yet other embodiments, the indication may be an index for a look-up table with stored transmit power values that are being used for a current configuration.

In some embodiments, the method 800 further includes the steps of receiving a first message of the two-step random access procedure, wherein the wireless device is enabled to transmit the first message at the transmit power level, and transmitting a second message of the two-step random access procedure.

In some embodiments, and in the context of FIG. 5, the method 800 further includes the step of receiving, from another network node serving an adjacent cell, an HII that indicates a presence of high interference from the adjacent cell. In an example, the network node is enabled to adjust the indication of the transmit power level based on receiving the HII.

In some embodiments, and in the context of FIG. 6, the method 800 further includes the step of receiving, from another network node serving an adjacent cell, an OI that indicates a presence of high interference from the adjacent cell. In an example, the network node is enabled to adjust the indication of the transmit power level based on receiving the OI.

Figure 8B:
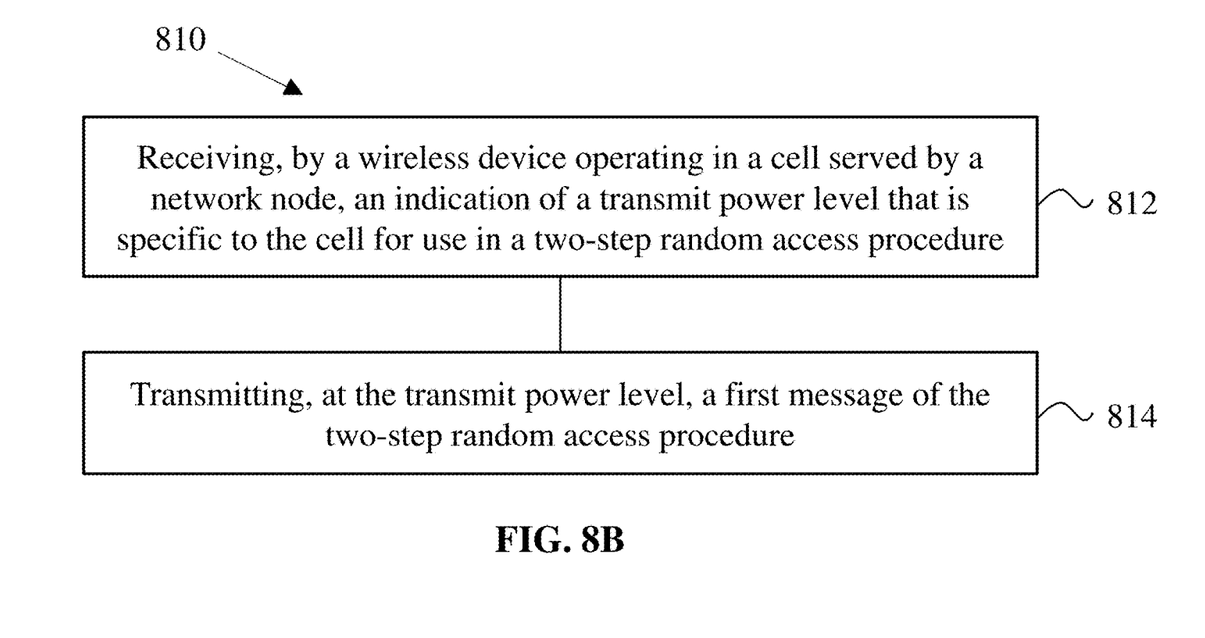

FIG. 8B shows an example of a wireless communication method 810 for power control for random access procedures in mobile communication technology. The method 810 includes, at step 812, receiving, by a wireless device operating in a cell served by a network node, an indication of a transmit power level that is specific to the cell for use in a two-step random access procedure. The method 810 includes, at step 814, transmitting, at the transmit power level, a first message of the two-step random access procedure.

In some embodiments, the method 810 further includes the step of receiving, from the network node, a second message of the two-step random access procedure.

In some embodiments, and in the context of methods 800 and 810, the indication comprises at least one resource index and at least one cell-specific transmission power offset. In an example, the at least one resource index is pre-configured.

In some embodiments, the at least one resource index comprises a physical resource block (PRB) start index and a number of PRBs. In other embodiments, the at least one resource index comprises a PRB start index and a PRB end index. In yet other embodiments, the at least one resource index comprises a plurality of PRB indexes.

In some embodiments, the at least one cell-specific transmission power offset comprises a first power offset and a second power offset. In other embodiments, the at least one cell-specific transmission power offset comprises a first power offset and a differential power offset, and a second power offset is a sum of the first power offset and the differential power offset. In yet other embodiments, the at least one cell-specific transmission power offset is based on a location of the wireless device in the cell served by the network node. In an example, a determination of the location of the wireless device is based on a first reference signal received power (RSRP) from the network node and one or more RSRPs from one or more network nodes serving cells adjacent to the cell.

Implementations for the Disclosed Technology

Figure 9:
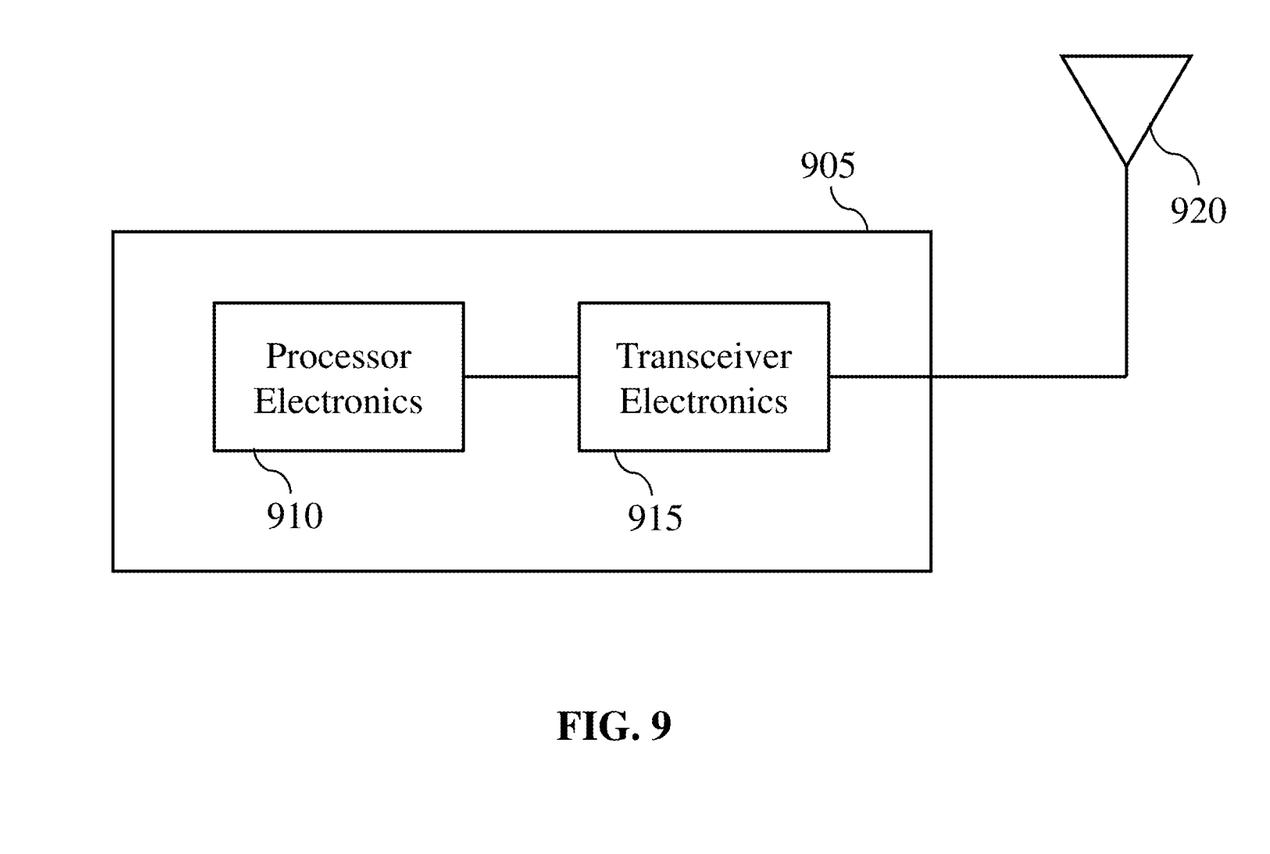
FIG. 9 is a block diagram representation of a portion of an apparatus, in accordance with some embodiments of the presently disclosed technology.

FIG. 9 is a block diagram representation of a portion of an apparatus, in accordance with some embodiments of the presently disclosed technology. An apparatus 905, such as a base station or a wireless device (or UE), can include processor electronics 910 such as a microprocessor that implements one or more of the techniques presented in this document. The apparatus 905 can include transceiver electronics 915 to send and/or receive wireless signals over one or more communication interfaces such as antenna(s) 920. The apparatus 905 can include other communication interfaces for transmitting and receiving data. Apparatus 905 can include one or more memories (not explicitly shown) configured to store information such as data and/or instructions. In some implementations, the processor electronics 910 can include at least a portion of the transceiver electronics 915. In some embodiments, at least some of the disclosed techniques, modules or functions are implemented using the apparatus 905.

It is intended that the specification, together with the drawings, be considered exemplary only, where exemplary means an example and, unless otherwise stated, does not imply an ideal or a preferred embodiment. As used herein, the use of "or" is intended to include "and/or", unless the context clearly indicates otherwise.

Some of the embodiments described herein are described in the general context of methods or processes, which may be implemented in one embodiment by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), etc. Therefore, the computer-readable media can include a non-transitory storage media. Generally, program modules may include routines, programs, objects, components, data structures, etc. that perform particular tasks or implement particular abstract data types. Computer- or processor-executable instructions, associated data structures, and program modules represent examples of program code for executing steps of the methods disclosed herein. The particular sequence of such executable instructions or associated data structures represents examples of corresponding acts for implementing the functions described in such steps or processes.

Some of the disclosed embodiments can be implemented as devices or modules using hardware circuits, software, or combinations thereof. For example, a hardware circuit implementation can include discrete analog and/or digital components that are, for example, integrated as part of a printed circuit board. Alternatively, or additionally, the disclosed components or modules can be implemented as an Application Specific Integrated Circuit (ASIC) and/or as a Field Programmable Gate Array (FPGA) device. Some implementations may additionally or alternatively include a digital signal processor (DSP) that is a specialized microprocessor with an architecture optimized for the operational needs of digital signal processing associated with the disclosed functionalities of this application. Similarly, the various components or sub-components within each module may be implemented in software, hardware or firmware. The connectivity between the modules and/or components within the modules may be provided using any one of the connectivity methods and media that is known in the art, including, but not limited to, communications over the Internet, wired, or wireless networks using the appropriate protocols.

While this document contains many specifics, these should not be construed as limitations on the scope of an invention that is claimed or of what may be claimed, but rather as descriptions of features specific to particular embodiments. Certain features that are described in this document in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or a variation of a sub-combination. Similarly, while operations are depicted in the drawings in a particular order, this should not be understood as requiring that such operations be performed in the particular order shown or in sequential order, or that all illustrated operations be performed, to achieve desirable results.

Only a few implementations and examples are described and other implementations, enhancements and variations can be made based on what is described and illustrated in this disclosure.

What is claimed is:

1. A method for wireless communication, comprising:
broadcasting, by a network node serving a cell, an indication of a transmit power level that is specific to the cell, wherein the indication is for use by a wireless device operating in the cell for a two-step random access procedure;
receiving a first message of the two-step random access procedure, wherein the wireless device is enabled to transmit the first message at the transmit power level; and
in response to receiving the first message, transmitting a second message of the two-step random access procedure,
wherein the indication comprises at least one cell-specific transmission power offset and at least one preconfigured resource index,
wherein the at least one cell-specific transmission power offset is based on a location of the wireless device in the cell served by the network node, and
wherein a determination of the location of the wireless device is based on a first reference signal received power (RSRP) from the network node and one or more RSRPs from one or more network nodes serving cells adjacent to the cell.

2. The method of claim 1, wherein the at least one preconfigured resource index comprises (a) a physical resource block start index and a number of physical resource blocks, (b) the physical resource block start index and a physical resource block end index, or (c) a plurality of physical resource block indices; and
wherein the at least one cell-specific transmission power offset comprises a first power offset and either (a) a differential power offset or (b) a second power offset that is a sum of the first power offset and the differential power offset.

3. The method of claim 1, further comprising:
receiving, from another network node serving an adjacent cell, an interference indication that indicates a presence of high interference from the adjacent cell; and
adjusting, by the network node, the at least one transmission power offset based on receiving the interference indication,
wherein the interference indication is a high interference indication (HII) or an overload indication (OI).

4. A method for wireless communication, comprising:
receiving, by a wireless device operating in a cell served by a network node, an indication of a transmit power level that is specific to the cell for use in a two-step random access procedure;
transmitting, at the transmit power level, a first message of the two-step random access procedure; and
receiving, from the network node, a second message of the two-step random access procedure,
wherein the indication comprises at least one cell-specific transmission power offset and at least one preconfigured resource index,
wherein the at least one cell-specific transmission power offset is based on a location of the wireless device in the cell served by the network node, and
wherein a determination of the location of the wireless device is based on a first reference signal received power (RSRP) from the network node and one or more RSRPs from one or more network nodes serving cells adjacent to the cell.

5. The method of claim 4, wherein the at least one preconfigured resource index comprises (a) a physical resource block start index and a number of physical resource blocks, (b) the physical resource block start index and a physical resource block end index, or (c) a plurality of physical resource block indices; and
wherein the at least one cell-specific transmission power offset comprises a first power offset and either (a) a differential power offset or (b) a second power offset that is a sum of the first power offset and the differential power offset.

6. An apparatus for wireless communication comprising a processor and a memory storing instructions that when executed by the processor, causes the processor to:
broadcast an indication of a transmit power level that is specific to a cell served by the apparatus, wherein the indication is for use by a wireless device operating in the cell for a two-step random access procedure,
receive a first message of the two-step random access procedure, wherein the wireless device is enabled to transmit the first message at the transmit power level; and
in response to receiving the first message, transmit a second message of the two-step random access procedure,
wherein the indication comprises at least one cell-specific transmission power offset and at least one preconfigured resource index,
wherein the at least one cell-specific transmission power offset is based on a location of the wireless device in the cell served by the apparatus, and
wherein a determination of the location of the wireless device is based on a first reference signal received power (RSRP) from the apparatus and one or more RSRPs from one or more network nodes serving cells adjacent to the cell.

7. The apparatus of claim 6,
wherein the at least one resource index comprises (a) a physical resource block start index and a number of physical resource blocks, (b) the physical resource block start index and a physical resource block end index, or (c) a plurality of physical resource block indices; and
wherein the at least one cell-specific transmission power offset comprises a first power offset and either (a) a differential power offset, or (b) a second power offset that is a sum of the first power offset and the differential power offset.

8. The apparatus of claim 6, wherein the processor is further caused to:
receive, from a network node serving an adjacent cell, an interference indication that indicates a presence of high interference from the adjacent cell; and
adjust the at least one transmission power offset based on receiving the interference indication,
wherein the interference indication is a high interference indication (HII) or an overload indication (OI).

9. An apparatus for wireless communication comprising a processor and a memory storing instructions that when executed by the processor, causes the processor to:
receive, in a cell served by a network node, an indication of a transmit power level that is specific to the cell to determine for use in a two-step random access procedure;
transmit, at the transmit power level, a first message of the two-step random access procedure; and
receive, from the network node, a second message of the two-step random access procedure,
wherein the indication comprises at least one cell-specific transmission power offset and at least one preconfigured resource index,
wherein the at least one cell-specific transmission power offset is based on a location of the apparatus in the cell served by the network node, and
wherein a determination of the location of the apparatus is based on a first reference signal received power (RSRP) from the network node and one or more RSRPs from one or more network nodes serving cells adjacent to the cell.

10. The apparatus of claim 9,
wherein the at least one resource index comprises (a) a physical resource block start index and a number of physical resource blocks, (b) the physical resource block start index and a physical resource block end index, or (c) a plurality of physical resource block indices; and
wherein the at least one cell-specific transmission power offset comprises a first power offset and either (a) a differential power offset, or (b) a second power offset that is a sum of the first power offset and the differential power offset.

* * * * *